US006751532B2

(12) United States Patent
Inokuchi

(10) Patent No.: US 6,751,532 B2
(45) Date of Patent: Jun. 15, 2004

(54) WIND TURBULENCE PREDICTION SYSTEM

(75) Inventor: Hamaki Inokuchi, Nishitokyo (JP)

(73) Assignee: National Aerospace Laboratory of Japan, Chofu (JP)

( * ) Notice: Subject to any disclaimer, the term of this patent is extended or adjusted under 35 U.S.C. 154(b) by 39 days.

(21) Appl. No.: 10/184,954

(22) Filed: Jul. 1, 2002

(65) Prior Publication Data

US 2003/0009268 A1 Jan. 9, 2003

(30) Foreign Application Priority Data

Jul. 5, 2001 (JP) ........................................ 2001-204466

(51) Int. Cl.$^7$ ................................................ G06G 7/76
(52) U.S. Cl. ........................ 701/14; 701/13; 244/75 R; 244/177
(58) Field of Search .................... 701/13, 14; 244/75 R, 244/177, 180, 182, 900

(56) References Cited

U.S. PATENT DOCUMENTS 3,719,337 A * 3/1973 Gardner ....................... 244/177
5,208,600 A * 5/1993 Rubin ........................... 342/26

OTHER PUBLICATIONS

Wagerer, Thomas J., et al.; "2μm LIDAR for Laser–Based Remote Sensing: Flight Demonstration and Application Survey"; *IEEE Aerospace and Electronics Systems Magazine*, vol. 10, No. 2, pp. 23–28; Feb. 1995.
Targ, Russell, et al.; "Coherent lidar airborne wind sensor II: flight–test results at 2 and 10μm"; *Applied Optics*, vol. 35, No. 36, pp. 7117–7127; Dec. 20, 1996.
Asaka, Kimio, et al. "1–5–μm eye–safe coherent lidar system for wind velocity measurement"; *Proceedings of SPIE*; vol. 4513, pp. 321–328; 2001.

Huffaker, R. MIlton, "Remote Sensing of Atmospheric Wind Velocities Using Solid–State and $Co_2$ Coherent Laser Systems"; *Proceedings of the IEEE*, vol. 84, No. 2, pp. 181–204; Feb. 1996
Killinger, Dennis; "Comparison of 2 micron Ho and 10 micron CO2 lidar for atomospheric backscatter and Doppler windshear detection"; *NASA Technical Reports* NASA–CR–189471, Nov. 22, 1991.
"WindTracer: "See" The Winds!: Advanced Laser Radar Technology Makes It Possible"; http://www.ctilidar.com/cti/clr/windtracer/windtracer.html (Jun. 4, 2002).

* cited by examiner

*Primary Examiner*—Gertrude A. Jeanglaude
(74) *Attorney, Agent, or Firm*—Westerman, Hattori, Daniels & Adrian, LLP

(57) ABSTRACT

The wind turbulence prediction system according to the present invention provides a measurement system, which is capable of measuring three-dimensional wind turbulence, exhibits limited aerodynamic and structural effects when mounted on an aircraft, is capable of measurement even in cases in which the velocity is equal to or less than 20 to 30 m/s, at which velocity a Pitot tube is incapable of measurement, and even in cases where the air flow direction differs greatly from the axis of aircraft body, and does not produce an error resulting from disruption of the air flow by the aircraft body itself. The wind turbulence prediction system of the present invention adopts a system that measures the speed of remote three-dimensional air flow by mounting a laser wind speed indicator utilizing the Doppler effect on an aircraft, irradiating laser light while scanning same in a cone shape, and then receiving scattered light from wind turbulence regions forward of an aircraft body in flight. Also, by considering the effects on the aircraft body exerted by a vertical wind and a fore and aft wind, measured three-dimensional air flow information is converted to a vertical wind alone and then displayed in simplified form in two dimensions, and wind turbulence is expressed through breakdown of same into turbulent flow strength and average wind.

8 Claims, 3 Drawing Sheets

PRINCIPLES OF A WIND MEASUREMENT LIDAR

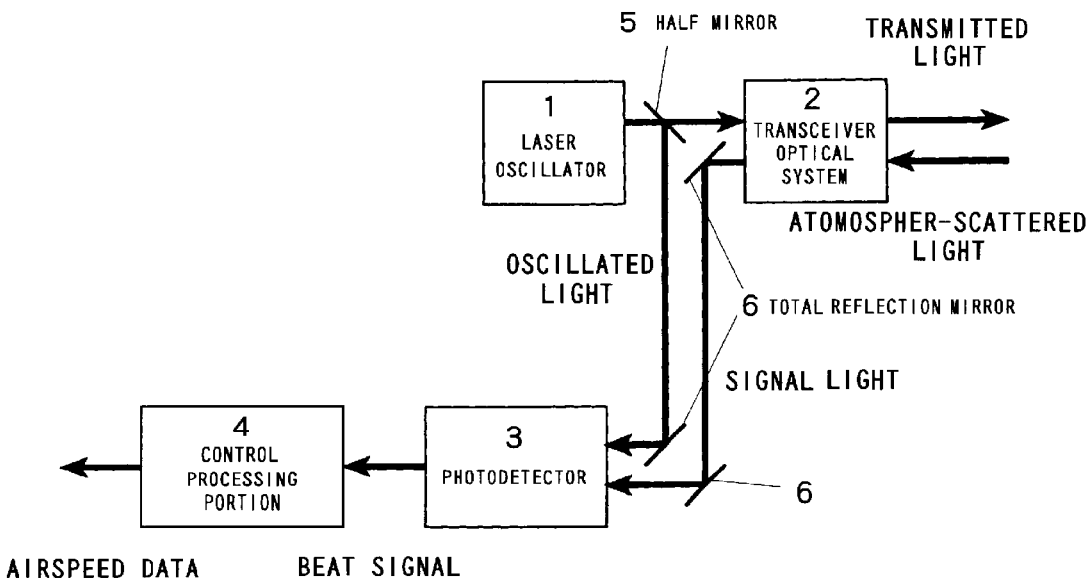
FIG.1 PRINCIPLES OF A WIND MEASUREMENT LIDAR
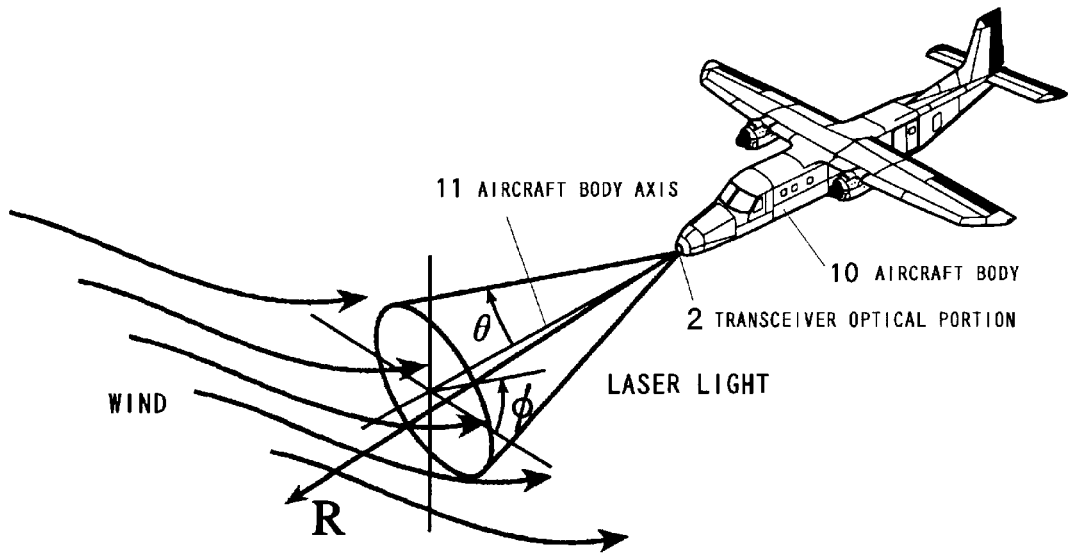
FIG.2

FIG.3 DEFINITION FOR AIR FLOW
THREE-DEMENSIONAL COMPONENT

WIND TURBULENCE PREDICTION SYSTEM

BACKGROUND OF THE INVENTION

1. Field of the Invention

The present invention relates to a technique for measuring, from an aircraft in flight, wind turbulence forward of the flight path of the aircraft, and for measuring the precise airspeed of the aircraft, and relates to a system thereof.

2. Description of the Related Art

An aircraft flying through the atmosphere is continually subject to wind effects, and an abrupt change in the wind is one principal cause of air crashes. As a result of a pilot having prior knowledge of flight path frontward wind shear, clear air turbulence, down burst, for example, a contribution can be made to flight safety in that the pilot can then alert passengers by means of a communication regarding wind turbulence, evade wind turbulence, and pilot the aircraft in such a manner that violent aircraft body movements are reduced. Use of measured information that involves transmitting same to a control system such as an auto-pilot control system is also conceivable. On the other hand, although normal flight tests are performed in the development and improvement of aircraft, precise airspeed measurement is indispensable in order to obtain basic characteristic data in the course of such flight tests.

Methods from the prior art of investigating wind turbulence and measuring airspeed include the following:

1) Wind Shear Warning Device

There are two kinds of wind shear warning device, namely: a device constituted to calculate wind, using an airspeed sensor, which is mounted on the aircraft body, from a comparison with inertial speed, to estimate wind shear from this difference in speed; and a device constituted to utilize electric waves to measure frontward wind turbulence.

2) Ground-Based Observation Device

This device permits observation of wind in an aircraft flight path by means of the ground-based installation of a remote sensor that observes the wind in the sky above, and systems employed in accordance with this object include systems utilizing sound waves, systems utilizing electric waves, and systems utilizing light waves, among which a system utilizing light waves is called a "wind measurement lidar".

3) Pitot Tube

This involves the use of a Pitot tube mounted on an aircraft body to measure the total pressure and static pressure of the air to thereby seek the airspeed from the impact pressure constituted by the difference between the total pressure and static pressure of the air. The Pitot tube is the most widely used aircraft airspeed sensor.

However, air flow measured by means of these conventional devices is in the direction of travel alone. Since air flow measured by means of a conventional Pitot tube or electric waves is in the direction of travel alone, is not possible to perform measurement of three-dimensional wind turbulence. Also, there is a problem that awareness using a wind shear warning system is difficult. In other words, with regard to some wind shear warning devices mounted on large aircraft, in emitting a warning hurriedly without prior notice, not only is awareness delayed, but it is also impossible to confirm whether such a warning is reliable. In addition, material permitting a judgement of what measures are to be taken, is limited. Further, when a cylindrical lens, which is ordinarily employed for an optical system of a wind measurement lidar, is mounted on an aircraft, a large protrusion by this cylindrical lens leads to large aerodynamic and structural effects, meaning that there has been the problem of there being a great number of limitations placed on mounted instruments and on the locations of these mounted instruments. Furthermore, a Pitot tube has a structural shortcoming of not being employable within a low velocity range. In other words, since the impact pressure measured using a Pitot tube is proportional to two times the airspeed, in a low velocity range, there is a large measurement error. Consequently, the velocity at which a Pitot tube can be utilized is normally 20 to 30 m/s or more. In addition, in cases of low velocity or when the air flow direction differs greatly from the aircraft body axis, measurement is not possible. Also, an airspeed sensor that is mounted directly on the aircraft body, such as a Pitot tube, for example, produces a measurement error resulting from disruption of the air flow by the aircraft body itself. This error is referred to as a position error, and such a position error is exhibited by a Pitot tube.

SUMMARY OF THE INVENTION

An object of the present invention is to resolve the numerous problems exhibited by conventional devices like those described above, in other words, to provide a measurement system capable of measuring three-dimensional wind turbulence, and which, instead of issuing sudden warnings without prior notice like those of a conventional wind shear warning system, performs inquiries by means of a constitution permitting confirmation in advance of whether or not a given warning is reliable and straightforward judgement of what measures are to be taken. Further, such a measurement system exhibits limited aerodynamic and structural effects when mounted on an aircraft, and is capable of measurement without the production of a position error, even in cases in which the velocity is equal to or less than 20 to 30 m/s, at which velocity a Pitot tube is incapable of measurement, and in cases where the air flow direction differs greatly from the aircraft body axis.

The wind turbulence prediction system of the present invention adopts a system that measures the speed of remote three-dimensional air flow by mounting a laser wind speed indicator utilizing the Doppler effect on an aircraft, irradiating laser light while scanning same in a cone shape, and then receiving scattered light from wind turbulence regions forward of an aircraft body in flight. Also, by considering the effects on the aircraft body exerted by a vertical wind and a fore and aft wind, measured three-dimensional air flow information is converted to a vertical wind alone and then displayed in simplified form in two dimensions, and wind turbulence is expressed through breakdown of same into turbulent flow strength and average wind. Also, when measured air flow information is communicated to the pilot, a turbulence position is displayed, not taking distance as a reference [of the turbulence position], but instead taking, as a reference, the time that elapses before the turbulence is encountered, and the ease of mounting, of a cylindrical optical system of a wind measurement lidar, is improved by cutting away a section of the cylindrical optical system.

BRIEF DESCRIPTION OF THE DRAWINGS

The present invention will now be described through reference to the attached figures.

FIG. 1 is a figure to describe the principles of a typical heterodyne system wind measurement lidar;

FIG. 2 is a conceptual diagram to show the condition of an air flow three-dimensional component calculation system, according to the present invention;

DESCRIPTION OF THE PREFERRED EMBODIMENTS

Figure 3:
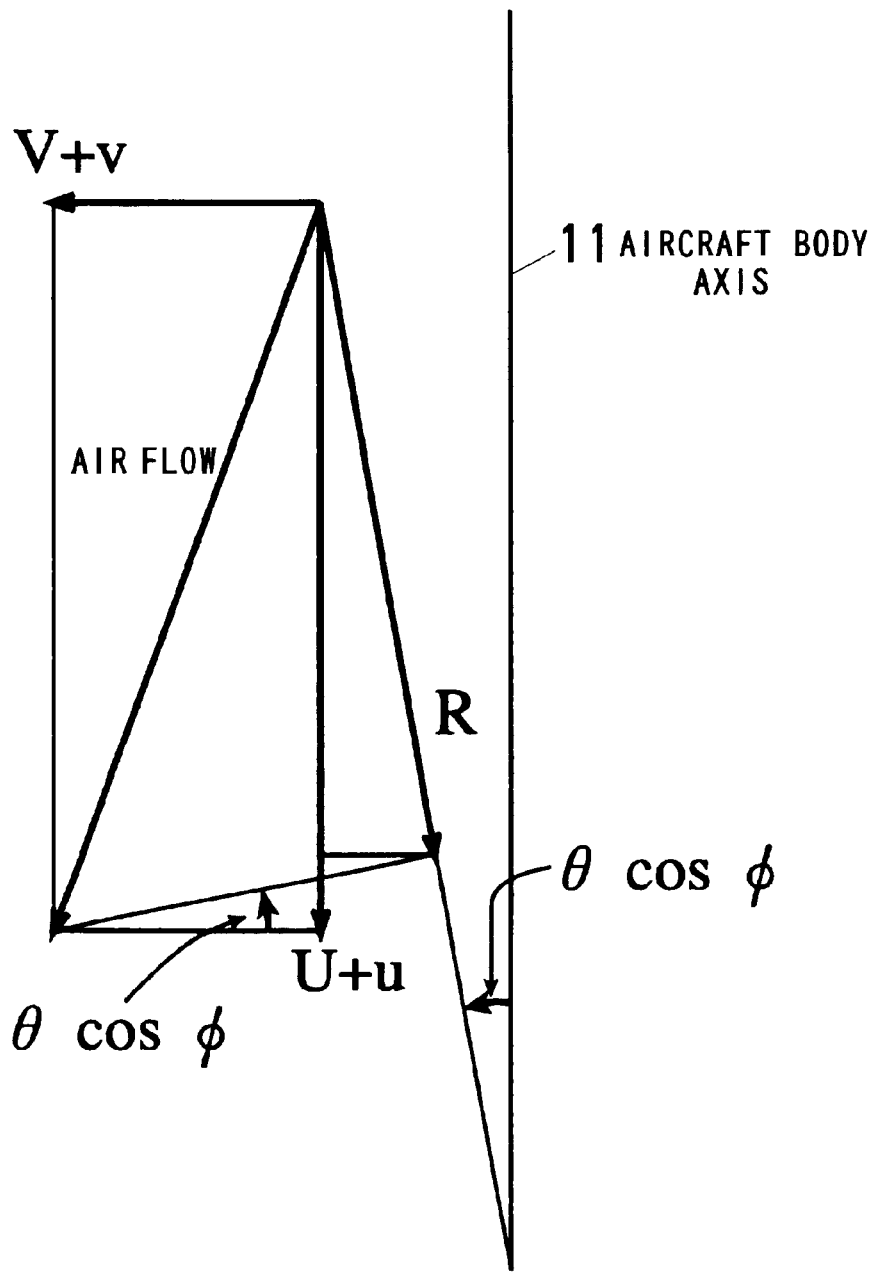
FIG. 3 is a figure to describe the calculation form of the air flow three-dimensional component calculation system, according to the present invention.

At present, although some large aircraft have a wind shear warning device utilizing electric waves mounted thereon, such devices are capable of measurement of air flow components in a fore and aft direction alone, and are not capable of acquiring knowledge on vertical winds or on crosswinds. For this reason, the present invention makes use of a wind measurement remote sensor (wind measurement lidar) that utilizes laser light, and, upon mounting this device on an aircraft, measurement is performed of three-dimensional air flow components by irradiating laser light while scanning same in a cone shape and by receiving scattered light that is returned as a result of being reflected by aerosols in the atmosphere. Further, conventional wind shear measurement systems, which issue sudden warnings for a system that emits warnings only when an abnormality occurs, do not allow time for confirmation of the reliability of warnings. Therefore, air flow conditions are displayed continually so that predictions are made possible prior to a warning being issued. At such a time, when air flow is expressed using three dimensions, the corresponding screen display becomes complicated and the burden on the pilot is increased. For this reason, the effects of a vertical wind and of a fore and aft wind on the aircraft body are considered, and then converted to and displayed as vertical winds alone. The degree of wind turbulence is broken down into turbulent flow strength and average wind, to thereby provide the pilot with more information. In cases where a wind measurement lidar is mounted on an aircraft, a cylindrical optical portion employed by a typical optical instrument is unfavorable in terms of ease of mounting on account of the large protrusion by such a cylindrical optical portion from the aircraft body. If a circular lens is cut in half to form a semicircular shape, practical use thereof can be made in improving ease of mounting without greatly affecting measurement performance.

Further, aircraft typically have a Pitot tube mounted thereon as an airspeed sensor. However, since a Pitot tube calculates an impact pressure that is proportional to two times the airspeed, for airspeeds within a low velocity range, the measurement error is large or measurement is not possible. A position error is also produced on the basis of the mount position of the Pitot tube on the aircraft body. On the other hand, where a wind measurement lidar is concerned, no such low velocity limitations exist, measurement also being possible for negative velocities. In measuring remote air flow, since there is also no position error effect, it is thought that, by mounting a wind measurement lidar on an aircraft, the problems described in the paragraph above can be resolved.

The wind turbulence prediction system of the present invention will be described in detail hereinbelow taking, by way of example, a case in which a wind measurement lidar is mounted on a small aircraft to calculate frontward air flow. A typical cruising speed for a small aircraft is on the order of 100 m/s, meaning that, when a 3 km remote air flow is measured, it can be predicted that the aircraft will encounter this air flow 30 seconds afterwards.

FIG. 1 is a figure to show the principles of a heterodyne system wind measurement lidar. As shown in FIG. 1, a heterodyne system emits laser light oscillated by means of a laser oscillator 1 as laser light from a transceiver optical system 2 and receives this laser light as atmosphere-scattered light (called signal light hereinafter). Since the wavelength of the atmosphere-scattered light changes as a result of a Doppler shift in accordance with the wind speed, a wavelength shift is produced between the oscillated light within the device and the received signal light. The light emitted from the laser oscillator 1 is guided in part to a photodetector 3 via a half mirror 5 and via a total reflection mirror 6 so as to be mixed in the photodetector 3 with signal light received by the transceiver optical system 2. A beat signal is produced due to the slight shift in wavelength between the oscillated light and the signal light. It is then possible to seek the wind speed by subjecting the beat signal resulting from this wavelength shift to signal processing by means of a control processing portion 4. In other words, the present invention is based in principle on laser Doppler speed measurement, and the object to be measured that is subjected to laser irradiation is aerosol, that is, particulate constituted by dust and water droplets suspended in the atmosphere. Since this particulate moves together with the flow of the atmosphere, it is possible to investigate the flow of the atmosphere through observation of light which is scattered by this particulate.

FIG. 2 is a figure to show a technique to break down air flow components into three dimensional directions by scanning laser light in a cone shape from the aircraft in an aircraft body axis frontward direction. Since a heterodyne system wind measurement lidar measures air flow components in the laser light emission direction, laser light is scanned in a cone shape for subsequent breakdown into an aircraft body axis fore and aft direction, a cross direction, and a vertical direction. When the angle (tilt angle of the laser light), which is formed by the irradiated laser light (from the laser light source) with respect to the aircraft body axis, which passes through the laser light source position, or with respect to an axis lying parallel with this axis, is taken to be θ, and the bank angle of the laser light (angle formed with respect to the lateral axis of the aircraft body) is taken to be φ, assuming that this angle θ is adequately small, or that most of the air flow is a fore and aft direction component, the fore and aft direction component of the air flow may be found using the formula below:

$$U+u=(\Sigma R/N)\cos\theta \qquad (1);$$

the cross direction component may be expressed using the following formula, as shown in FIG. 3:

$$V+v=\{U+u-R\cos(\theta\cos\phi)\}/\tan(\theta\cos\phi) \qquad (2);$$

and, similarly, the vertical direction component is as per the following formula:

$$W+w=\{U+u-R\cos(\theta\sin\phi)\}/\tan(\theta\sin\phi) \qquad (3),$$

where:

U: air speed fore and aft direction component (vertical direction in FIG. 3);

V: air speed cross direction component (left and right direction in FIG. 3);

W: air speed vertical direction component (a direction, from the upper side to the underside of the sheet, in FIG. 3);

u: fore and aft direction component of wind turbulence;

v: cross direction component of wind turbulence;

w: vertical direction component of wind turbulence;

R: measured speed in a laser light irradiation direction;

θ: tilt angle of the laser light;

φ: bank angle of the laser light (angle formed with respect to the lateral axis of the aircraft body);

N: measurement frequency.

Since it is difficult to grasp the effects on the aircraft body using three-dimensional air flow information as-is, according to the present invention, this information is reported following conversion of the effect exerted by a fore and aft wind on lift, into a vertical wind that causes the same effect. In other words, three-dimensional air flow information is simplified to a two-dimensional form.

Assuming that the airspeed is U, the air density is ρ, the lift coefficient is $C_L$, and the wing area is S, generally the lift (L) may be found using the following formula:

$$L=(1/2)\rho U^2 C_L S \qquad (4).$$

The lift (L'), in a case where a fore and aft wind (u) is received in this condition, may be found using the following formula:

$$L'=(1/2)\rho(U+u)^2 C_L S \qquad (5).$$

Similarly, the lift (L''), in a case where a vertical wind (w) is received, may be found using the following formula:

$$L''=(1/2)\rho^2 C_{L\alpha}(\alpha+d\alpha)S \qquad (6),$$

where: $C_{L\alpha}$ is the lift inclination, and the change in the [wing] attack angle $d\alpha=\tan^{-1}(w/U)$.

Assuming that the change in the lift is the same, when the lift inclination $C_{L\alpha}$ is approximated using a constant that pertains to a particular aircraft, it is then possible to convert a fore and aft wind to a vertical wind using the following formula:

$$w=\tan[\{(1+(u/U)^2)/C_{L\alpha}\}-\alpha]U \qquad (7).$$

Then, by expressing the wing attack angle (α) as a function of the airspeed (v) as shown below, there is no requirement to measure the wing attack angle;

$$\alpha=2F/\rho v^2 C_{L\alpha}S \qquad (8),$$

where, here, F is the weight of the aircraft body.

Next, a description will be provided with regard to a system of expressing wind turbulence by means of breakdown of same into turbulent flow strength and average wind.

First of all, turbulent flow strength (G) is defined using the following formula:

$$G=(\delta u^2+\delta v^2+\delta w^2)^{1/2} \qquad (9),$$

where, here, δ expresses a fluctuation amount within a fixed time.

The turbulent flow strength may be ascertained easily if displayed using colors distinguishing levels that constitute references, that is, where red corresponds to a turbulent flow strength for which, by way of example, there is a possibility of an accident occurring if a seat belt is not worn, yellow represents a turbulent flow strength at which, even though violent rocking of the aircraft body takes place, there is no possibility of this rocking being directly connected with an accident, and green represents a turbulent flow strength other than that described above.

The average wind can be defined using the following formula when the average value of the fore and aft direction component of the wind turbulence is mu, the average value of the cross direction component of the wind turbulence is mv, and the average value of the vertical direction component of the wind turbulence is mw:

$$mu=\Sigma u/N \qquad (10)$$

$$mv=\Sigma v/N \qquad (11)$$

$$mw=\Sigma w/N \qquad (12).$$

N is the measurement frequency, and, for wind shear recognition, it may be anticipated that it is necessary to set N taking an average on the order of one second, for instance. Ultimately, N is a numerical figure that should be elected according to the test performed.

When measured air flow information is communicated to the pilot, in a case where a turbulence position is expressed as a distance, because there is then a requirement to calculate the time, until this turbulence is encountered, from the flight speed of the aircraft, a large burden is placed on the pilot. Therefore, displaying the time until this turbulence is encountered as a reference is advantageous. The time (t) until the measured turbulence is encountered may be expressed using the following formula assuming that the distance until the measured turbulence is encountered is d, and that the fore and aft direction component of the airspeed is U:

$$t=d/U \qquad (13).$$

Also, according to the present invention, in order to improve ease of mounting of the lidar optical portion, an optical system is constituted by sectioning a lens to form a semi-circular shape. In comparison with a circular lens, a semi-circular lens with the same area as the circular lens has a protrusion when mounted of approximately 70% thereof. As a result, in addition to the advantage that air flow disruption caused by the presence of the optical portion is low, and that aerodynamic and structural mounting conditions are lenient, since the lens condensing rate is the same if the effective area is the same, there is no great difference in performance as a measuring instrument. Moreover, no chromatic aberration is produced since the laser light has a single wavelength.

EXAMPLE 1

Figure 4:
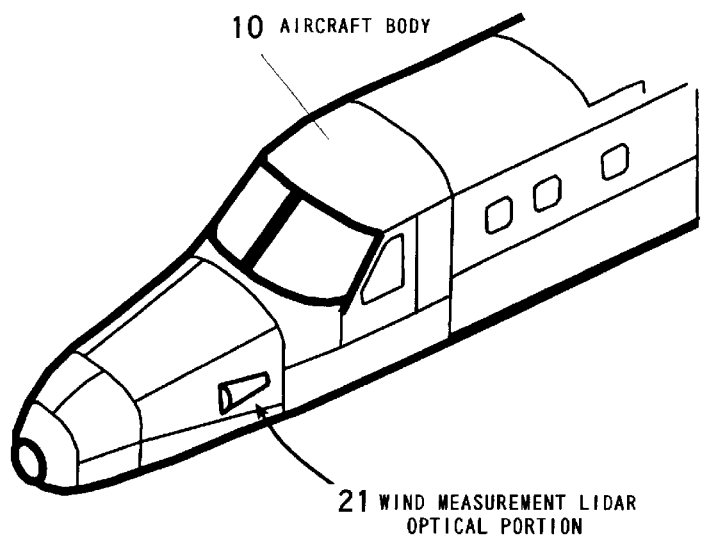
FIG. 4 is a figure to show an example in which a non-cylindrical wind measurement lidar optical portion according to the present invention is mounted on a side wall of an aircraft nose.

FIG. 4 is a figure to show a state in which a wind measurement lidar according to the present invention is mounted on a small aircraft. The mount position of the optical portion in the present example is on a side face of the aircraft nose as shown in the figure, but is not limited to this position, a mount position on the underside of the fuselage or on the underside of a main wing also being conceivable, it being possible to mount the wind measurement lidar in a location permitting straightforward mounting in accordance with a particular aircraft body. Excepting the optical portion, a control portion and data processing portion are installed in special apparatus. Since the wind measurement lidar is not subject to low velocity range measurement limitations, it is also possible to employ such a lidar in low speed aircraft such as helicopters. An infrared range laser is preferable which is very safe for the retina of the eyes, which is not very receptive to the effects of weather conditions, and, in this example, a 1.5 μm band laser is employed. The laser beam scanning method makes use of a system in which a tilt angle θ is constant and a bank angle φ is caused to turn at a fixed velocity value. Oscillated light, and signal light which is returned after being scattered by aerosols, are mixed, and, with a measurement region set to reach a number of kilometers, light, which is scattered in an interval constituted by the distance from a position directly before the aircraft body to a position that is a prescribed number of kilometers therefrom, is combined cumulatively with received signal light. In the absence of a turbulence region in this interval, the frequency of the signal light shifts from the frequency of the oscillated light by a Doppler shift amount that corresponds to the airspeed. However, if, after a given period, a change in this frequency is produced, this change signifies that there is a turbulence region in a region lying a prescribed number of kilometers further ahead. Then, as this region approaches in accordance with the airspeed, subsequent signal light is received such that air flow conditions for a region ahead are sequentially combined with information on corresponding turbulence regions. For this kind of data processing, Doppler type radar technology can be employed, and it is thus possible to detect a desired air flow component.

Figure 5:
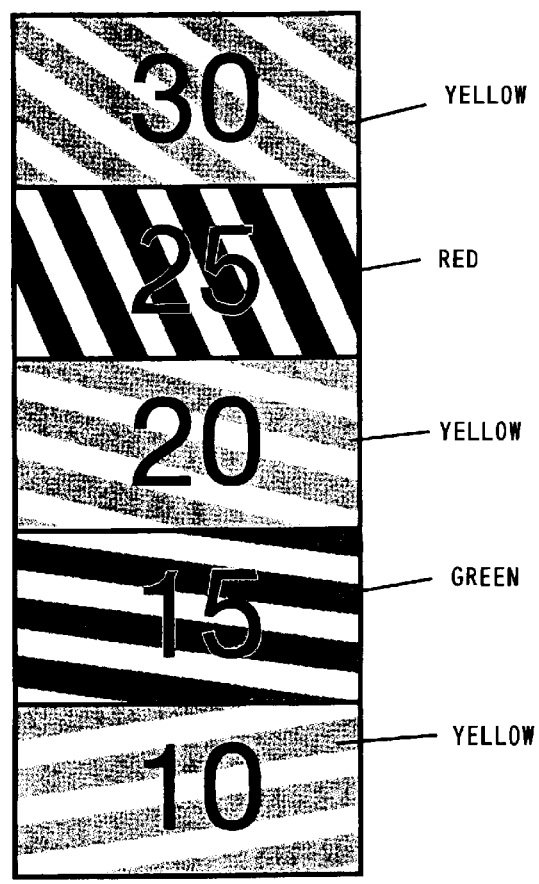
FIG. 5 is a figure to show a display constitution for a wind turbulence condition, as adopted by the embodiment of the present invention.

FIG. 5 is a monitor display permitting recognition by a pilot of wind turbulence, as employed by the present example, where figures indicate the number of seconds that elapse before the aircraft body reaches the air flow measurement region (distance/velocity). In the example shown, the measurement region is shown divided into five sections. Striped sections serve to indicate wind speed and strength, and wind direction, and stripes move at speeds in proportion to an average wind, where a wind from below causes horizontal stripes to move upwards, and a wind from the right causes vertical stripes to move to the left. As per the method described hereinabove, a fore and aft wind is displayed in a combined fashion following conversion thereof into a vertical wind. The color of the stripes represents the degree of turbulent flow strength, where red indicates danger, yellow indicates caution, and green indicates a stable condition.

The wind turbulence prediction system of the present invention measures the speed of remote three-dimensional air flow by mounting a laser wind speed indicator utilizing the Doppler effect on an aircraft, irradiating laser light while scanning same in a cone shape, and then receiving scattered light from wind turbulence regions forward of an aircraft body in flight, meaning that the pilot of the aircraft is able to obtain prior knowledge of frontward wind turbulence in the course of the flight, and by employing the wind turbulence prediction system with the objects of evading this wind turbulence, abandoning a landing approach, and alerting flight staff and passengers, a contribution can be made to flight safety. Moreover, there is no position error as associated with a Pitot tube, and a [wind measurement lidar of the present invention] can be employed as a sensor that exhibits no precision degradation even within a low velocity range.

Further, the wind turbulence prediction system considers, among three-dimensional air flow information, an effect exerted by a fore and aft wind on an aircraft body in the form of lift, converts this fore and aft wind effect into a vertical wind effect, and combines this converted value with vertical wind information to thereby display [information] in simplified form in two dimensions. As a result, the burden placed on the pilot is small. Furthermore, since wind turbulence is expressed through breakdown of same into turbulent flow strength and average wind, it is possible to provide a larger amount of information. Also, if a constitution is adopted in which turbulent flow strength is displayed using different colors, and, of average wind information, if wind direction is displayed by the movement direction of a striped pattern, and wind speed is displayed by the speed of movement of the striped pattern, wind turbulence information is made obvious to facilitate understanding.

The wind turbulence prediction system of the present invention is constituted to display a turbulence position, from measured air flow information, not taking distance as a reference [of the turbulence position] but instead taking, as a reference, the time that elapses before the aircraft encounters the turbulence, which makes it easy to interact with passengers in alerting them, for example. In addition, understanding of conditions is made even more straightforward by means of a constitution which partitions a display region into individual encounter-time regions, and displays, in each display region, the turbulent flow strength and average wind information, of the encounter-time regions.

Furthermore, according to the wind turbulence prediction system of the present invention, if a cylindrical optical system, of a wind measurement lidar, is installed in a constitution with a section of the cylindrical optical system cut away, it is possible to improve ease of mounting without greatly affecting measurement performance.

What is claimed is:

1. A wind turbulence prediction system for an aircraft, wherein said wind turbulence prediction system for an aircraft measures the speed of remote three-dimensional air flow by mounting a laser wind speed indicator utilizing the Doppler effect on an aircraft, irradiating laser light while scanning same in a cone shape, and then receiving scattered light from wind turbulence regions forward of the aircraft body in flight;

wherein said wind turbulence prediction system for an aircraft expresses wind turbulence by breakdown of same into turbulent flow strength and average wind.

2. The wind turbulence prediction system for an aircraft according to claim 1, wherein said wind turbulence prediction system for an aircraft considers, among three-dimensional air flow information, an effect exerted by a fore and aft wind on the aircraft body in the form of lift, converts into a vertical wind effect, and combines this converted value with vertical wind information to thereby display in simplified form in two dimensions.

3. The wind turbulence prediction system for an aircraft according to claim 1, wherein said wind turbulence prediction system for an aircraft displays turbulent flow strength using different colors, and, of average wind information, displays wind direction by the movement direction of a striped pattern, and displays wind speed by the speed of movement of the striped pattern.

4. The wind turbulence prediction system for an aircraft according to any of claims 1 through 2, wherein said wind turbulence prediction system for an aircraft displays a turbulence position, from measured air flow information, not taking distance as a reference, but instead taking, as a reference, the time that elapses before the aircraft encounters the turbulence.

5. The wind turbulence prediction system for an aircraft according to claim 4, wherein said wind turbulence prediction system for an aircraft partitions a display region into individual encounter-time regions, and displays, in each display region, the turbulent flow strength and average wind information, of the encounter-time regions.

6. The wind turbulence prediction system for an aircraft according to any of claims 1 through 2, wherein said wind turbulence prediction system for an aircraft improves ease of mounting of a cylindrical optical system, of a wind measurement lidar, by cutting away a section of the cylindrical optical system.

7. A wind turbulence prediction system for an aircraft, wherein said wind turbulence prediction system for an aircraft measures the speed of remote three-dimensional air flow by mounting a laser wind speed indicator utilizing the Doppler effect on an aircraft, irradiating laser light while scanning same in a cone shape, and then receiving scattered light from wind turbulence regions forward of the aircraft body in flight; and wherein said wind turbulence prediction system for an aircraft considers, among three-dimensional air flow information, an effect exerted by a fore and aft wind on the aircraft body in the form of lift, converts this fore and aft wind effect into a vertical wind effect, and combines this converted value with vertical wind information to thereby display information in simplified form in two dimensions.

8. A wind turbulence prediction system for an aircraft, wherein said wind turbulence prediction system for an aircraft measures the speed of remote three-dimensional air flow by mounting a laser wind speed indicator utilizing the Doppler effect on an aircraft, irradiating laser light while scanning same in a cone shape, and then receiving scattered light from wind turbulence regions forward of the aircraft body in flight;

wherein said wind turbulence prediction system for an aircraft displays a turbulence position, from measured air flow information, not taking distance as a reference of said turbulence position, but instead taking, as a reference, the time that elapses before the aircraft encounters the turbulence.

* * * * *